No. 850,718. PATENTED APR. 16, 1907.
W. H. ASH.
GAS ENGINE.
APPLICATION FILED MAY 1, 1906.
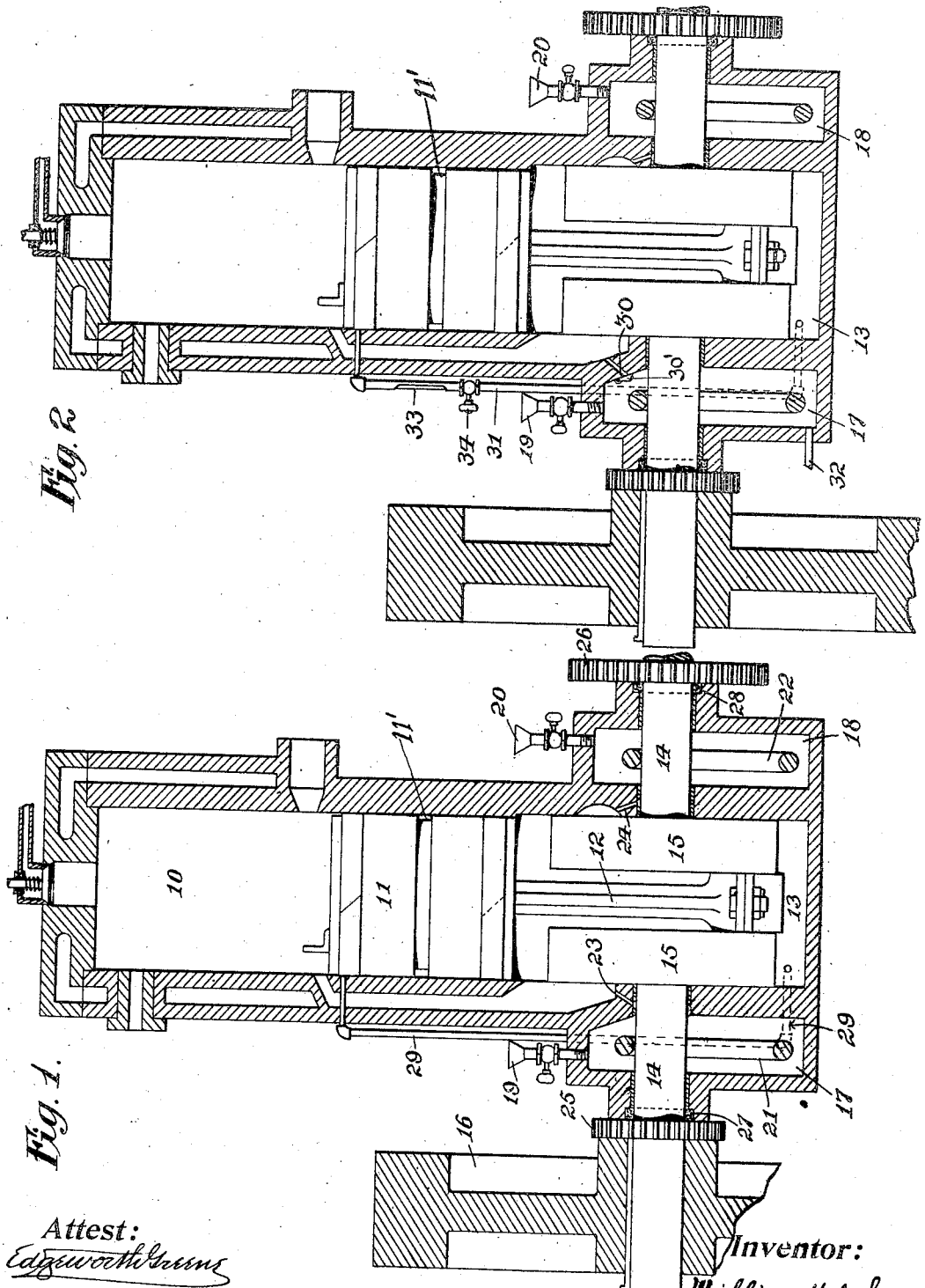
Attest:
Edgeworth Greene
William Abbe
Inventor:
William H. Ash
by Howson and Howson Attys.

UNITED STATES PATENT OFFICE.

WILLIAM H. ASH, OF BAY SHORE, NEW YORK.

GAS-ENGINE.

No. 850,718.　　　　　Specification of Letters Patent.　　　Patented April 16, 1907.

Application filed May 1, 1906. Serial No. 314,669.

*To all whom it may concern:*

Be it known that I, WILLIAM H. ASH, a citizen of the United States of America, residing in Bay Shore, county of Suffolk, State of New York, have invented certain new and useful Improvements in Gas-Engines, of which the following is a specification.

My invention relates to gas-engines, and particularly to a lubricating means therefor. The main object of my invention is to provide a simple and efficient system whereby the piston, crank, driving-shaft, or any other part of the engine may be properly lubricated on supplying oil to one or more convenient places.

In the accompanying drawings, Figure 1 shows a sectional elevation of a gas-engine with my preferred form of lubricating system applied, and Fig. 2 is a similar view with a modified arrangement.

In Fig. 1 of the drawings, 10 represents the cylinder of the engine, with a piston 11, piston-rod 12, and crank case or chamber 13. A driving-shaft 14, with balance-weights 15 and fly-wheel 16, are also of ordinary construction.

On opposite sides of the crank-chamber I provide oil-chambers 17 and 18, with suitable means, such as the oil-cups 19 and 20, for supplying oil thereto. Within each chamber and driving-shaft is a stirring-ring 21. Between these chambers and the crank-chamber are connecting-passages 23 and 24, preferably through the bearings for the shaft 14. The oil is carried up onto the shaft 14 from each chamber, and naturally flows into the bearings on both sides. Adjacent to the gear-wheels 25 and 26 are packing-rings 27 and 28 of absorbent material, that are continually kept moist and lubricate the gears and also prevent leakage. From the lower part of the crank-chamber a pipe 29 leads to a point on the upper part of the cylinder for lubricating the piston and cylinder. This pipe 29 opens into the cylinder at a point between the ends of the stroke of the piston 11, so as to be constantly covered by the latter. The piston is provided with an annular groove 11', into which a small quantity of oil squirts when the groove comes opposite the outlet of the pipe in the up and down strokes of the piston.

The arrangement shown in Fig. 2 is for the most part very similar to that shown in Fig. 1. In this case I provide a direct communication between one or both of the oil-chambers 17 and 18 and the crank-chamber 13 by a passage 30. If desired, a check-valve 30' or the like may be placed on the lower side of this passage so as to open on the downstroke and close on the upstroke. With this construction I prefer to lubricate the piston by means of a pipe 31 passing up from the bottom of the oil-chamber. A pipe 32, leading from the lower part of this chamber, may conduct oil to any other part of the engine to be lubricated. If desired, the pipe 31 may be supplied with a transparent part 33 for observing the flow of oil and also a cock 34 for regulating the flow. In using either arrangement any desired amount of oil sufficient to run the engine for a number of hours is introduced into the oil-chambers through the oil-cups 19 and 20. As the shaft rotates the oil is fed up onto it by means of the stirrers and spreads to the bearings. The partial vacuum caused by the upstroke of the piston draws through the passages 23 and 24, Fig. 1, a very small quantity of oil, which after lubricating the bearings drips into the bottom of the crank-chamber. The compression caused by the downstroke will force a very small quantity up through the pipe 29 to lubricate the piston.

In Fig. 2 the operation is substantially the same. The passage 30 being above the shaft prevents more than the desired quantity of oil from passing through to the crank-chamber, and on the downstroke the compression is transmitted to the oil-chamber and the oil is forced through the pipe 31 to the piston in the same way. The cock 34 may be turned to regulate the proper flow. It is obvious that this arrangement may be applied to either or both oil-chambers, and the two chambers may be connected together by a pipe, thereby doing away with two oil-cups.

I claim as my invention—

1. In combination with a gas-engine, having a cylinder, crank-chamber and driving-shaft, a lubricating system comprising an oil-chamber adjacent to said crank-chamber and a passage other than the shaft-bearing between said oil and crank-chambers.

2. In combination with a gas-engine, having a cylinder, crank-chamber and driving-shaft, a lubricating system comprising a chamber, means for supplying oil to said chamber, a stirring means therein and communications other than the shaft-bearing between said oil-chamber and the crank-chamber for supplying oil thereto.

3. In combination with a gas-engine having a cylinder, crank-chamber and driving-shaft, a lubricating system comprising an oil-chamber adjacent to said crank-chamber and a passage connecting said oil-chamber and crank-chamber, and means for lubricating the interior of the cylinder from the crank-chamber.

4. In combination with a gas-engine, having a cylinder and piston, a crank-chamber and driving-shaft, a lubricating system comprising an oil-chamber adjacent to the crank-chamber, a passage connecting said chambers, and a pipe leading from one of said chambers for lubricating another part of the engine.

5. In combination with a gas-engine, having a cylinder and piston, a crank-chamber and driving-shaft, a lubricating system comprising an oil-chamber adjacent to the crank-chamber, a passage connecting said chambers, and means to prevent leakage from said oil-chamber at the shaft-bearing.

6. In combination with a gas-engine, having a cylinder and piston, a crank-chamber and driving-shaft, a lubricating system comprising an oil-chamber adjacent to the crank-chamber, a passage connecting said chambers, a pipe leading from one of said chambers for lubricating the piston, and means for regulating the flow therethrough.

7. In combination with a gas-engine having a cylinder and piston, a crank-chamber and driving-shaft, a lubricating system comprising an oil-chamber adjacent to the crank-chamber, a passage connecting said chambers, a pipe leading from one of said chambers for lubricating the piston, and means for observing the flow through said pipe.

8. In combination with a gas-engine, having a cylinder, and annularly-grooved piston, a crank-chamber, and driving-shaft, a lubricating system comprising a pipe leading from the crank-chamber to the cylinder to supply oil to the groove in the piston.

9. In combination with a gas-engine having a cylinder and piston, and a crank-chamber, a lubricating system comprising an oil-chamber, a passage between the oil-chamber and the crank-chamber, and a check-valve for closing said passage, on the return stroke of the piston.

In testimony whereof I have signed my name to this specification in the presence of two subscribing witnesses.

WILLIAM H. ASH.

Witnesses:
HUBERT HOWSON,
EDNA W. COLLINS.